United States Patent Office 3,320,131
Patented May 16, 1967

---

3,320,131
METHOD FOR THE TREATMENT OF HERNIATION OF INTERVERTEBRAL DISCS
Lyman W. Smith, Elgin, Ill., assignor to Baxter Laboratories, Inc., Morton Grove, Ill., a corporation of Delaware
No Drawing. Filed Oct. 23, 1964, Ser. No. 406,144
7 Claims. (Cl. 167—73)

This application is a continuation-in-part of application Ser. No. 251,979, filed Jan. 16, 1963, now abandoned. The invention described herein relates to a method of treating herniated intervertebral discs in animals, including human beings, and, in particular, the herniated lumbar intervertebral discs. More particularly, this invention relates to the use of enzymes for the in vivo dissolution of a portion of the cartilaginous material in an intervertebral disc substance whereby the clinical manifestations resulting from herniation of intervertebral discs are alleviated.

Intervertebral discs consist of fibrocartilages that are interposed between the adjacent surfaces of the vertebrae. These discs form the chief bonds of connection between the vertebrae. In shape and size they conform generally with the surfaces of the vertebrae between which they are placed. The intervertebral fibrocartilages are adherent, by their surfaces, to two thin layers of hyaline cartilage which cover the upper and under surfaces of the bodies of the vertebrae.

Each intervertebral disc is composed, at its circumference of laminae of fibrous tissue and fibrocartilage, forming the annulus fibrosus; and, at its center, of nucleus pulposus, which is a soft, pulpy, highly elastic substance, of a yellowish color, which projects considerably above the surrounding level when the disc is divided horizontally. This nucleus pulposus is especially well developed in the lumbar region of the spine. The intervertebral fibrocartilages are important shock absorbers. Under pressure the highly elastic nucleus pulposus becomes flatter and broader and pushes the more resistant fibrous laminae outward in all directions.

Upon the imposition of excessive stresses or pressure spinal discs will herniate with consequent extrusion or protrusion of nucleus pulposus from the disc. This extruded nucleus pulposus will often impinge upon nerve roots leading from the spinal cord with consequent marked clinical manifestations, varying in degree of severity from pain to paralysis.

Heretofore, the surgical procedure characterized as laminectomy has been the principal means employed to repair the pathology resulting from disc herniation. In accordance with the latter procedure the extruded nucleus pulposus is removed surgically, thereby relieving the pressure and, in the absence of irreversible nerve damage, alleviating the clinical symptoms. Although laminectomies are commonly performed in herniated disc situations, they are, nevertheless, surgical procedures and involve all of the dangers inherent in any surgical procedures. Exemplary of these dangers are the risk of residual paralysis resulting from pressure, during surgery, on the spinal cord, or from injury of the nerve roots or spinal cord from retraction during surgery. Blood loss, surgical shock and pulmonary embolism are other potential dangers.

An object of this invention is to provide a safe and effective non-surgical technique as a substitute for laminectomy in the repair of herniated discs in animals.

Another object is to provide an enzyme technique for the selective in vivo dissolution of nucleus pulposa.

Other objects and advantageous features of this invention will become apparent from the following detailed description.

In accordance with the method of the present invention, a small amount of proteolytic enzyme is injected directly into a spinal disc in order to dissolve the nucleus pulposa, annulus fibrosus and the hyaline cartilage. The dissolution of nucleus pulposa by this technique relieves the clinical manifestations of herniated discs as effectively as does laminectomy.

Proteolytic enzymes which have been found effective in the practice of this invention include pharmaceutically acceptable preparations of papain, chymopapain, bromelin, ficin trypsin and various suitable proteases derived from plant, animal fungal and bacaterial sources and, of these, chymopapain is preferred. A particularly suitable preparation contains about 600,000 chymopapain-tyrosine equivalent units [1] per gm. It may be administered either non-activated in physiologic saline or activated in distilled water containing 0.01 M cysteine hydrochloride which functions as an enzyme activator and 0.001 M disodium ethylene diamine tetracetate, which acts as a preservative.

The quantity of proteolytic enzyme required for the safe and effective repair of a herniated disc will vary with the proteolytic power of the enzyme on the substrate nucleus pulposus, the species of animal and the consequent differences in size of the intervertebral discs, and the degree to which dissolution of nucleus pulposus is desired.

The results of preliminary clinical tests on human patients show that the method of the present invention holds good promise as an effective and useful method for the treatment of the chronic, recurring condition of herniation of the nucleus pulposa in humans. These preliminary clinical tests were conducted on patients who were classified in the category of "operative cases" in that each suffered incapacitating sciatica which had not been relieved by various treatments, and each had positive physical findings indicating a protrusion or extrusion of a herniated lumbar intervertebral disc. In these preliminary clinical tests, the following procedure was employed:

General anesthesia was used in all cases. Each patient was placed on his side on an X-ray table and, under sterile precautions, 3½ or 4 inch 20 or 21 gauge spinal needles were inserted into the two lowest lumbar interveretebral discs by the posterolateral approach of Erlacher [Nucleography, J Bone Joint Surg (Amer.) 34-B:204–210 May 1952]. In two of the patients, one disc space could not be penetrated by the needle. Needle placement was confirmed by anteroposterior and lateral X-rays and, in each case, a discogram was done with a 50% solution of sodium diatrizoate. Chymopapain, dissolved in normal sodium chloride solution varying in volume from 0.4 to 1.0 ml., was then injected at each level in amounts varying from 4 to 16 mg.

Substantial subsidence in pain due to herniation of intervertebral discs was noted in these patients after periods ranging from several hours to several days following the above treatment according to the method of the present invention. Examination of these patients about one month following the treatment confirmed an effectual reduction in pain by the treatment according to the method of the present invention.

It will be appreciated that the specific concentrations and amounts of proteolytic enzyme required for effective

---

[1] One unit of activity is defined as that amount of enzyme which will produce, per minute, from a 1% solution of acid-denatured hemoglobin, at pH 4.0 in the presence of cysteine and ethylenediamine tetracetate, trichloroacetic acid-soluble products, with absorbancy at 275 m$\mu$ equivalent to that of 1 $\mu$g. per ml. of tyrosine.

alleviation of the clinical manifestations resulting from herniation of intervertebral discs will vary from patient to patient from the concentrations and the amounts of enzyme used in the above preliminary clinical tests, said preliminary clinical tests being set forth for the purposes of illustration and not limitation. As will be readily apparent to those skilled in the art to which the invention pertains, other variations, modifications and adaptations in the method of the present invention can be made without departing from the spirit and scope of the invention. Accordingly, all such modifications, variations and adaptations are included within the scope of this invention as defined in the appended claims.

I claim:

1. The method of treating a herniated spinal disc in an animal which comprises the step of injecting into said disc an amount of a pharmaceutically acceptable solution of a proteolytic enzyme sufficient to selectively dissolve the nucleus pulposa of said disc.

2. The method of treating a herniated lumbar spinal disc in an animal which comprises the step of injecting into said disc an amount of a pharmaceutically acceptable solution of a proteolytic enzyme sufficient to selectively dissolve the nucleus pulposa of said disc.

3. The method of treating a herniated spinal disc in an animal which comprises the step of injecting into said disc an amount of a pharmaceutically acceptable solution of chymopapain sufficient to selectively dissolve the nucleus pulposa of said disc.

4. The method of treating a herniated spinal disc in an animal which comprises the step of injecting into said disc an amount of a pharmaceutically acceptable solution of chymopapain sufficient to selectively dissolve the nucleus pulposa of said disc, said solution comprising physiologic saline.

5. The method of treating a herniated spinal disc in an animal which comprises the step of injecting into said disc an amount of a pharmaceutically acceptable solution of chymopapain sufficient to selectively dissolve the nucleus pulposa of said disc, said solution comprising an amount of cysteine hydrochloride sufficient to activate the chymopapain.

6. The method of treating a herniated spinal disc in an animal which comprises the steps of (1) inserting a needle into said disc, (2) confirming the placement of the needle by means of X-ray, and (3) injecting into said disc an amount of a pharmaceutically acceptable solution of a proteolytic enzyme sufficient to selectively dissolve the nucleus pulposa of said disc.

7. The method of treating a herniated spinal disc in an animal which comprises the steps of (1) inserting a needle into said disc, (2) confirming the placement of the needle by means of X-ray, and (3) injecting into said disc an amount of a pharmaceutically acceptable solution of chymopapain sufficient to selectively dissolve the nucleus pulposa of said disc.

No references cited.

ALBERT T. MEYERS, *Primary Examiner.*

SAM ROSEN, *Examiner.*

L. B. RANDALL, *Assistant Examiner.*